United States Patent
Stol et al.

(10) Patent No.: US 7,383,975 B2
(45) Date of Patent: *Jun. 10, 2008

(54) FRACTURE RESISTANT FRICTION STIR WELDING TOOLS

(75) Inventors: Israel Stol, Pittsburgh, PA (US); John W. Cobes, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 469 days.

This patent is subject to a terminal disclaimer.

(21) Appl. No.: 11/133,083

(22) Filed: May 19, 2005

(65) Prior Publication Data

US 2006/0043152 A1 Mar. 2, 2006

Related U.S. Application Data

(60) Provisional application No. 60/605,960, filed on Aug. 30, 2004.

(51) Int. Cl.
*B23K 20/12* (2006.01)
(52) U.S. Cl. .................... 228/2.1; 228/112.1
(58) Field of Classification Search ............ 228/112.1, 228/2.1

See application file for complete search history.

(56) References Cited

U.S. PATENT DOCUMENTS

| | | | |
|---|---|---|---|
| 3,643,969 A | 2/1972 | Finley et al. | |
| 4,356,574 A * | 11/1982 | Johnson ........................ | 4/676 |
| 5,460,317 A | 10/1995 | Thomas et al. | |
| 6,029,879 A | 2/2000 | Cocks ......................... | 228/2.1 |
| 6,273,323 B1 | 8/2001 | Ezumi et al. | |
| 6,516,992 B1 * | 2/2003 | Colligan .................. | 228/112.1 |
| 6,648,206 B2 | 11/2003 | Nelson et al. ........... | 228/112.1 |
| 6,669,075 B2 * | 12/2003 | Colligan ..................... | 228/2.3 |
| 6,676,004 B1 | 1/2004 | Trapp et al. .................. | 228/2.1 |
| 6,706,130 B1 | 3/2004 | Minamitani et al. | |
| 6,758,382 B1 | 7/2004 | Carter | |
| 6,779,704 B2 * | 8/2004 | Nelson et al. ........... | 228/112.1 |
| 6,799,708 B2 * | 10/2004 | von Strombeck et al. ... | 228/2.1 |
| 6,908,690 B2 | 6/2005 | Waldron et al. | |
| 6,994,242 B2 * | 2/2006 | Fuller et al. ............. | 228/112.1 |
| 7,275,675 B1 * | 10/2007 | Carter et al. .................. | 228/2.1 |
| 2003/0029903 A1 | 2/2003 | Kashiki et al. | |
| 2003/0209588 A1 | 11/2003 | Colligan | |
| 2005/0139640 A1 | 6/2005 | Kay | |
| 2005/0252947 A1 | 11/2005 | Fujii et al. | |
| 2006/0043151 A1 | 3/2006 | Stol et al. | |
| 2006/0049232 A1 | 3/2006 | Murakami | |

FOREIGN PATENT DOCUMENTS

JP 2000362959 6/2002

OTHER PUBLICATIONS

Office Action mailed from the U.S. Patent and Trademark Office on Jun. 13, 2006 as Paper No. 20060608, relating to U.S. Appl. No. 11/235,584, consisting of ten (10) pages.
Office Action mailed the U.S. Patent and Trademark Office on Nov. 21, 2006 as Paper No. 20061117, relating to U.S. Appl. No. 11/235,584, consisting of ten (10) pages.
Office Action mailed from the U.S. Patent and Trademark Office on Oct. 16, 2007 as Paper No. 20071010, relating to U.S. Appl. No. 11/100,878, consisting of thirteen (13) pages.

* cited by examiner

*Primary Examiner*—Kevin P. Kerns
*Assistant Examiner*—Michael Aboagye
(74) *Attorney, Agent, or Firm*—Greenberg Traurig LLP; Peter J. Borghetti

(57) ABSTRACT

A fracture resistant friction stir welding tool includes a pin for plunging into one or more workpiece(s) to be welded and a shoulder for preventing plasticized material from flowing out of the joint being welded. The friction stir welding tool includes a tool body including a cavity for receiving the shoulder and exerting a compressive stress on the shoulder, and the pin is placed in compression by an axial tension member in the pin.

21 Claims, 7 Drawing Sheets ary patent application and the regular application are hereby incorporated herein by reference thereto.

FRACTURE RESISTANT FRICTION STIR WELDING TOOLS

CROSS REFERENCE TO RELATED APPLICATIONS

The present invention is based on the provisional patent application entitled "Advanced Friction Stir Welding Tools", Application No. 60/605,960, filed on Aug. 30, 2004. The present invention is also closely related to the regular patent application entitled "Advanced Friction Stir Welding Tools", U.S. Ser. No. 11/100,878, filed on Apr. 7, 2005. Furthermore, the teachings of both the provisional application and the regular application are hereby incorporated herein by reference thereto.

FIELD OF THE INVENTION

The present invention relates to friction stir welding tools and, more particularly, the present invention relates to friction stir welding tools having fracture resistant features.

BACKGROUND OF THE INVENTION

The Friction Stir Welding (FSW) process is a solid-state based joining process, which makes it possible to weld a wide variety of materials (Aluminum, Copper, Stainless Steels, etc.) to themselves and to weld various combinations (e.g. aluminum alloys 6xxx/5xxx, 2xxx/7xxx, etc.) to each other. The process is based on "plunging" a rotating FSW tool into the joining area. The rotating friction stir welding tool heats the workpiece(s) by friction, so the material becomes plasticized and flows around the axis of the tool due to shear caused by the rotating tool.

FIG. 1 shows a prior art friction stir welding tool 10. The tool 10 includes a pin 12 which, preferably, is threaded. The shank 18 is for gripping in a chuck or collet of a friction stir welding machine, so that tool 10 can be rotated. While tool 10 is rotating, pin 12 is pressed against the workpiece(s) which is/are to be welded. Friction between the workpiece(s) and pin 12 causes the material of the workpiece(s) to become heated to its softening temperature and thus plasticized.

Pressure between pin 12 and the plasticized workpiece(s) causes pin 12 to be plunged into the workpiece(s). Friction between the pin 12 and the workpiece(s) causes plasticized workpiece material to flow around the axis of pin 12 and thus welding occurs without melting. The shoulder 14, having workpiece engaging surface 16, is for preventing material from flowing upwardly, out of the joint being formed. The tool is rotated in the direction such that the threads 13 on pin 12 push plasticized material downwardly into the joint. Optionally, pin 12 further has flats 15 which reduce the torque required to rotate friction stir welding tool 10.

Preferably, workpiece engaging surface 16 of shoulder 14 has a spiral thread 17 which tends to move plasticized material inwardly, toward the proximal end of pin 12, when tool 10 is rotated in the direction for which the threads 13 on pin 12 push plasticized material downwardly into the joint.

Since the workpiece material(s) being friction stir welded is/are heated to such a high temperature by friction with the tool that the workpiece material(s) becomes softened or "plasticized", while the tool, to remain dimensionally stable, must not become plasticized, it is necessary for the tool to have a higher operating temperature range than the workpiece(s). The tool may be comprised of a very hard metal having good high temperature properties, or it may be comprised of a cement or a ceramic material. However, such materials are generally subject to failure by fracture.

Tool failure thus puts limitations on the materials which can be welded by friction stir welding, and also puts limits on the speed with which a friction stir welding tool can be caused to move along a joint being welded. It is desirable to increase friction stir welding speeds both from the standpoint of production, and also because faster welding results in a narrower and stronger heat affected zone in the weldment. There is thus a need for improved friction stir welding tools which are more fracture resistant than present day friction stir welding tools.

SUMMARY OF THE INVENTION

The present invention is a friction stir welding tool including an integral pin and shoulder, a pin portion of the integral pin and shoulder being for plunging into one or more workpiece(s) to perform a friction stir welding operation on the workpiece(s). The shoulder portion of the tool includes a working surface for engaging at least one surface of the workpieces(s) to prevent plasticized material from flowing out of the workpiece(s). A proximal end of the pin portion is contiguous with the working surface of the shoulder portion of the integral pin and shoulder. The friction stir welding tool further includes a tool body defining a cavity therein, said cavity for receiving at least a portion of the shoulder portion of the integral pin and shoulder, the tool body further including a shank for engagement with a chuck or collet of a friction stir welding machine. The friction stir welding tool further includes a tension member disposed at least partially within the pin portion of the integral pin and shoulder, the tension member placing the pin portion in compression whereby cyclic tensile stresses due to bending moments on the pin portion as it rotates are reduced.

In another aspect, the present invention is a bobbin type friction stir welding tool including a tool body defining a cavity therein, the tool body further including a shank for engagement with a chuck or collet of a friction stir welding machine. The bobbin type friction stir welding tool further includes a proximal shoulder disposed at least partially within the cavity, a friction stir welding pin having a proximal end contiguous with a working face of the proximal shoulder, a distal shoulder having a working face contiguous with a distal end of the friction stir welding pin, and a tension member disposed at least partially within the friction stir welding pin, the tension member placing the pin in compression whereby cyclic tensile stresses due to bending moments on the pin as it rotates are reduced.

DETAILED DESCRIPTION OF PREFERRED AND VARIOUS ALTERNATIVE EMBODIMENTS OF THE INVENTION

Figure 1:
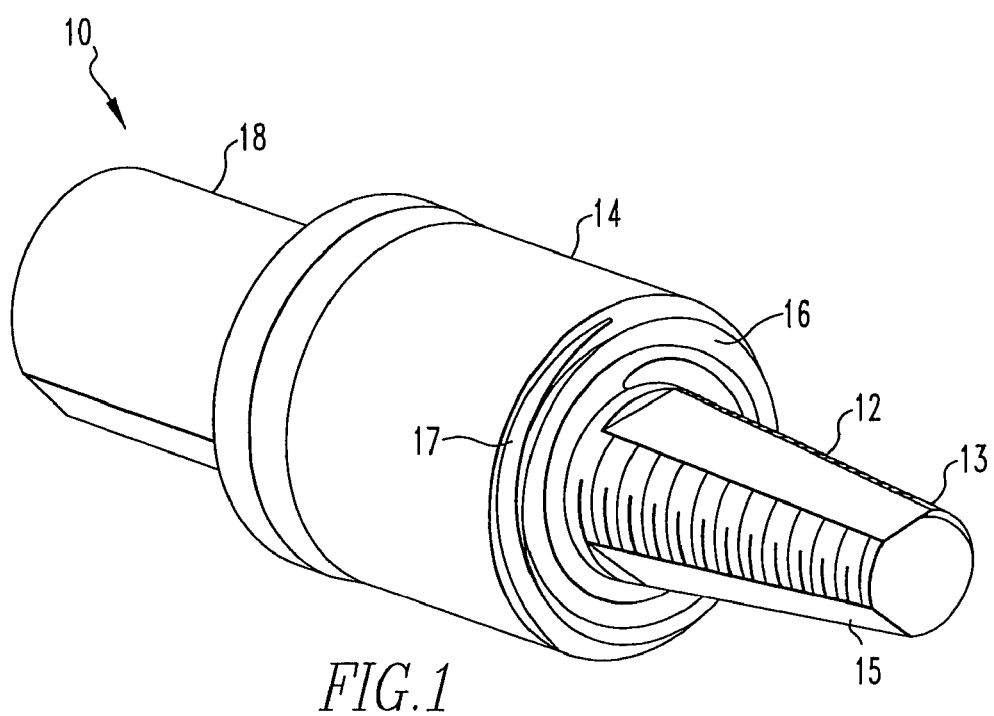
FIG. 1 is a sketch of a prior art friction stir welding tool.
Figure 2:
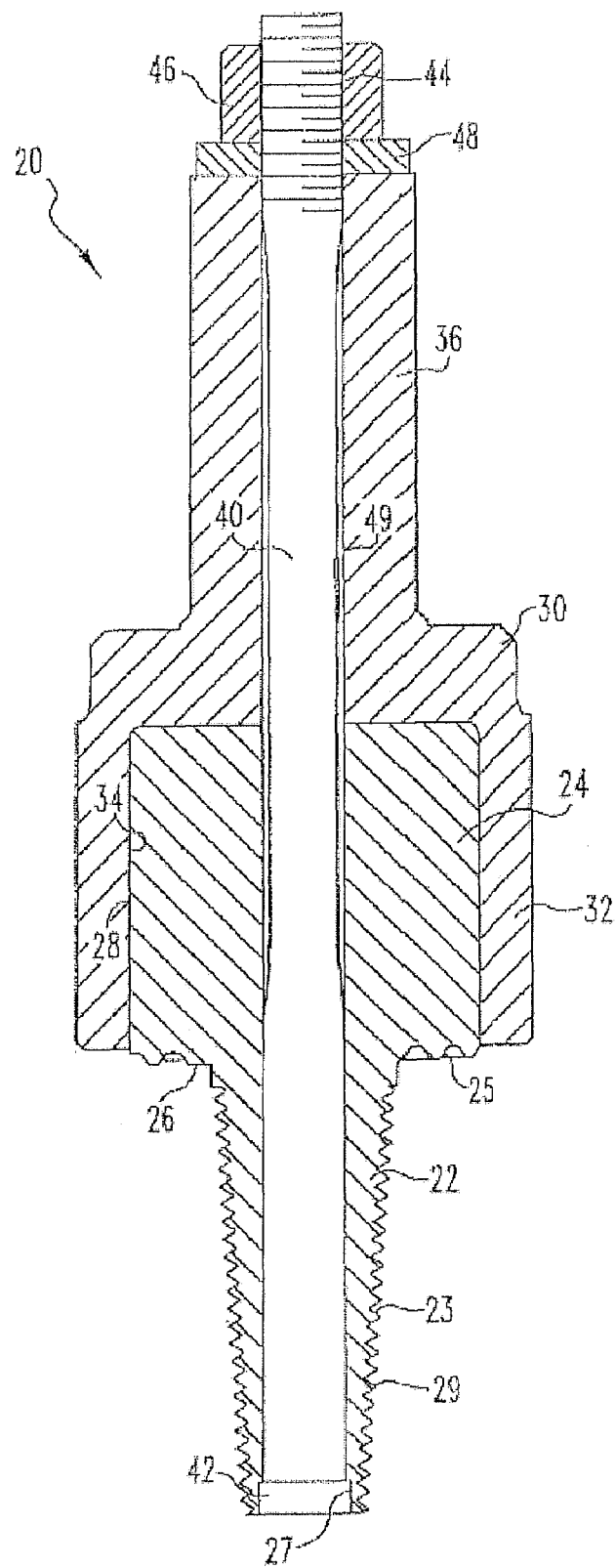
FIG. 2 is a median sectional sketch of a friction stir welding tool according to the present invention which includes a tension rod for placing the pin of the tool in compression and a compression sleeve for placing the shoulder of the tool in compression.

Attention is directed to FIG. 2, which is an illustration of a friction stir welding tool 20 according to one embodiment of the present invention. Friction stir welding tool 20 includes a pin 22 which is integral with a shoulder 24. Pin 22 has working surface 29, preferably with threads 23. Shoulder 24 has working surface 26, preferably with spiral threads 25. Friction stir welding tool 20 includes a tool body 30 with a compression sleeve 32 defining therewithin a cavity 34.

Compression sleeve 32 provides inward compression on outer surface 28 of shoulder 24. Tool body 30 further includes a shank 36 which is for engagement with a chuck or collet (not shown) of a friction stir welding machine (not shown), to be rotated thereby. Preferably, when friction stir welding tool 20 is rotated in the direction such that threads 23 on pin 22 push plasticized material downwardly along pin 22, into a joint being welded, the spiral threads 25 urge plasticized material inwardly, toward the proximal end of pin 22.

Friction stir welding tool 20 further includes a tension member 40 including a shoulder 42 and threaded portion 44. Preferably, tension member 40 is a tension rod. Shoulder 42 is received in recess 27 in the distal end of pin 22. Force to supply tension to tension member 40 is supplied by nut 46 engaging threaded portion 44 of tension member 40. That force is supplied through one or more spring washer(s) 48. Spring washer(s) 48 accommodate thermal expansion or creep of tension member 40. Spring washer(s) 48 may, for example only, be Belleville washers. Preferably, a gap 49 is provided between tension member 40 and shank 36, as well as between tension member 40 and shoulder 24 to facilitate assembly.

The function of tension member 40 is to place pin 22 in axial compression so that cyclic bending stresses on pin 22 as it rotates and translates through one or more workpiece(s) being welded are reduced. This is to obtain a longer life for pin 22.

Likewise, compression sleeve 32 exerts a radially inward compression on shoulder 24 to prevent shoulder 24 from cracking. The purpose of friction stir welding tool 20 is to facilitate the use of hard, high temperature materials, such as ceramics, for the pin 22 and shoulder 24. This enables the friction stir welding tool 20 to be employed on workpiece materials having higher softening temperatures than has hitherto been practical. Alternatively, friction stir welding tool 20 may be employed for faster welding on workpiece materials presently being welded by friction stir welding.

For assembling friction stir welding tool 20, the tool body 30 is heated and quickly assembled to the shoulder 24 so as to place shoulder 24 in radially inward compression.

Figure 3:
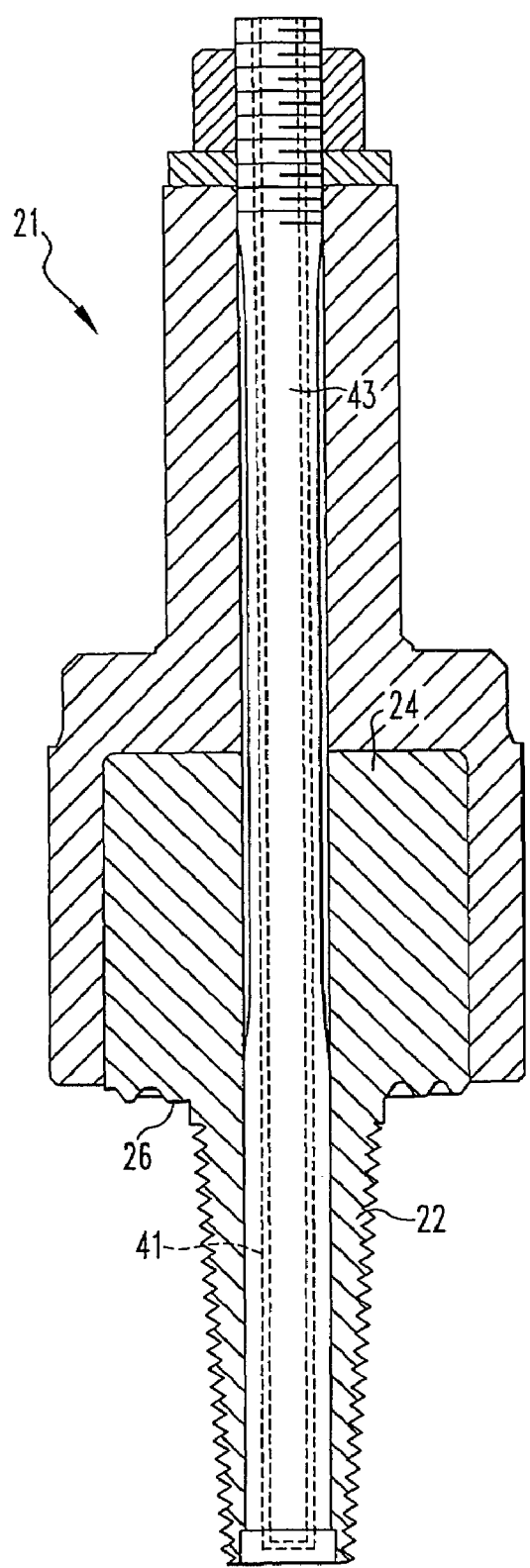
FIG. 3 is a median sectional sketch similar to FIG. 2, but showing a cooling passage in the tension rod.

FIG. 3 illustrates a friction stir welding tool 21, which is similar to friction stir welding tool 20 discussed above. Friction stir welding tool 21 includes a tension member 43 including therein a coolant passage 41. Coolant passage 41 is for cooling pin 22 and shoulder 24. Coolant is supplied by a commutation means (not shown) at the proximal end of tension member 43.

Figure 4:
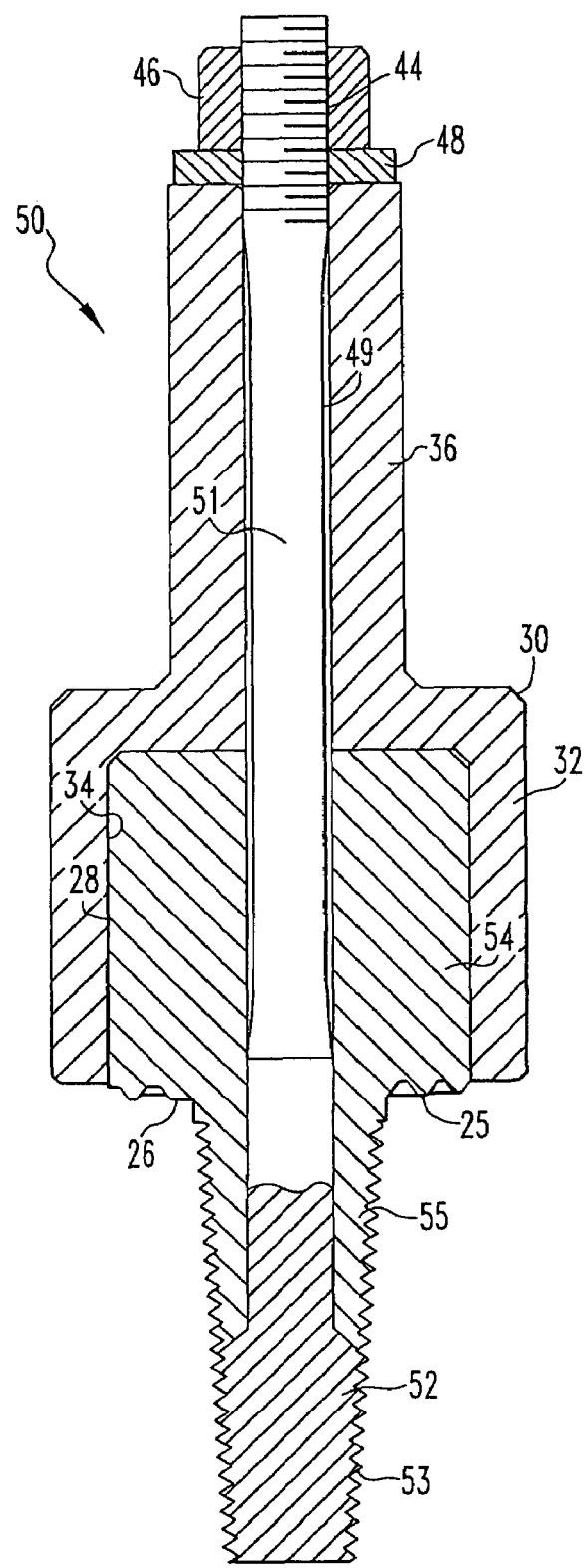
FIG. 4 is a median sectional sketch showing a FSW tool having a tension rod with a distal portion which serves as a pin extension.

FIG. 4 is an illustration of a friction stir welding tool 50, according to another embodiment of the present invention. Friction stir welding tool 50 includes a proximal pin portion 55 which is integral with shoulder 54. Tool body 30 includes compression sleeve 32 defining cavity 34 therewithin. Compression sleeve 32 holds shoulder 54 and exerts a radially inward compressive stress on outer surface 28 of shoulder 54. Shoulder 54 includes a working face 26, preferably with a spiral thread 25.

Tool body 30 further includes shank 36 for engagement with a chuck or collet (not shown) of a friction stir welding machine. Friction stir welding tool 50 further includes a tension member 51 including a distal pin portion 52 including working surface 53. The proximal pin portion 55 and distal pin portion 52 together act as the pin in a friction stir welding tool. Tension is supplied to tension member 51 by nut 46 engaging threaded portion 44 of tension member 51. One or more spring washers (48) provide for thermal expansion or creep of tension member 51. Tension member 51 exerts a compressive force on proximal pin portion 55 to reduce cyclic tensile stresses in proximal pin portion 55 and thus prolong the life of proximal pin portion 55.

As with the previously discussed embodiments of the present invention, the inward radial compression supplied by compression sleeve 32 on shoulder 54 tends to prevent cracking of shoulder 54. With this design, hard, high temperature materials such as ceramics can be employed for proximal pin portion 55 and shoulder 54.

Figure 5:
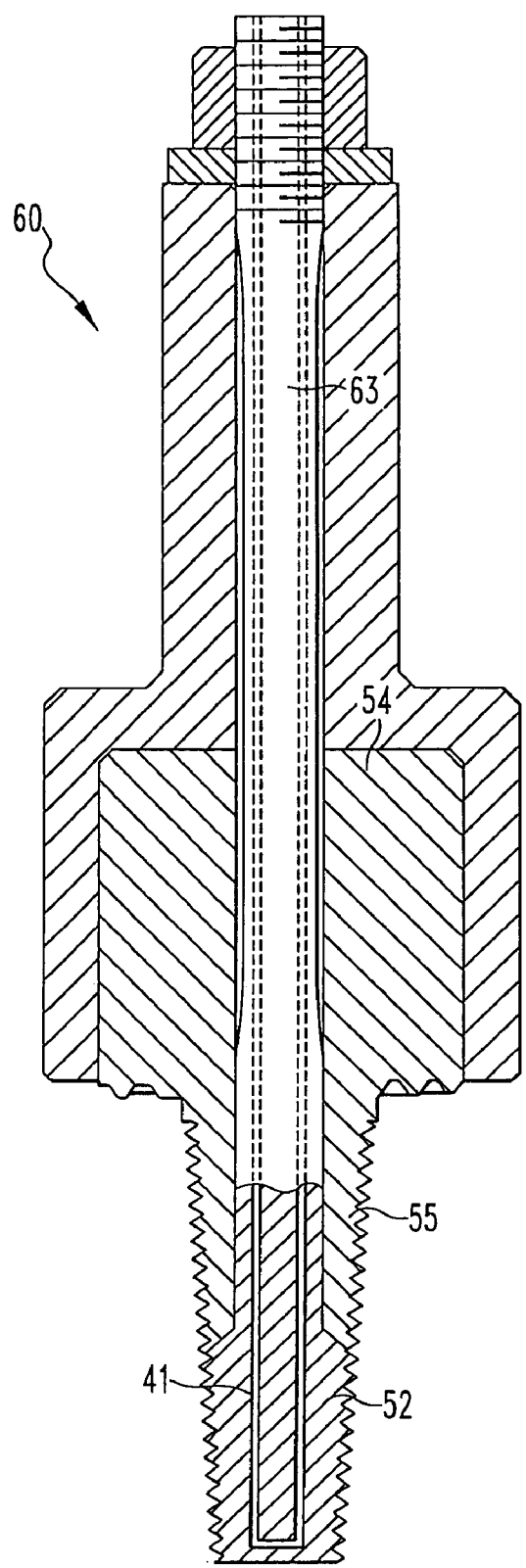
FIG. 5 is a sketch similar to FIG. 4 showing a cooling passage in the tension rod.

FIG. 5 illustrates another embodiment of the present invention. Friction stir welding tool 60 is similar to friction stir welding tool 50, but friction stir welding tool 60 includes tension member 63 including cooling duct 41. Cooling duct 41 is for cooling shoulder 54, proximal pin portion 55 and distal pin portion 52.

Figure 6:
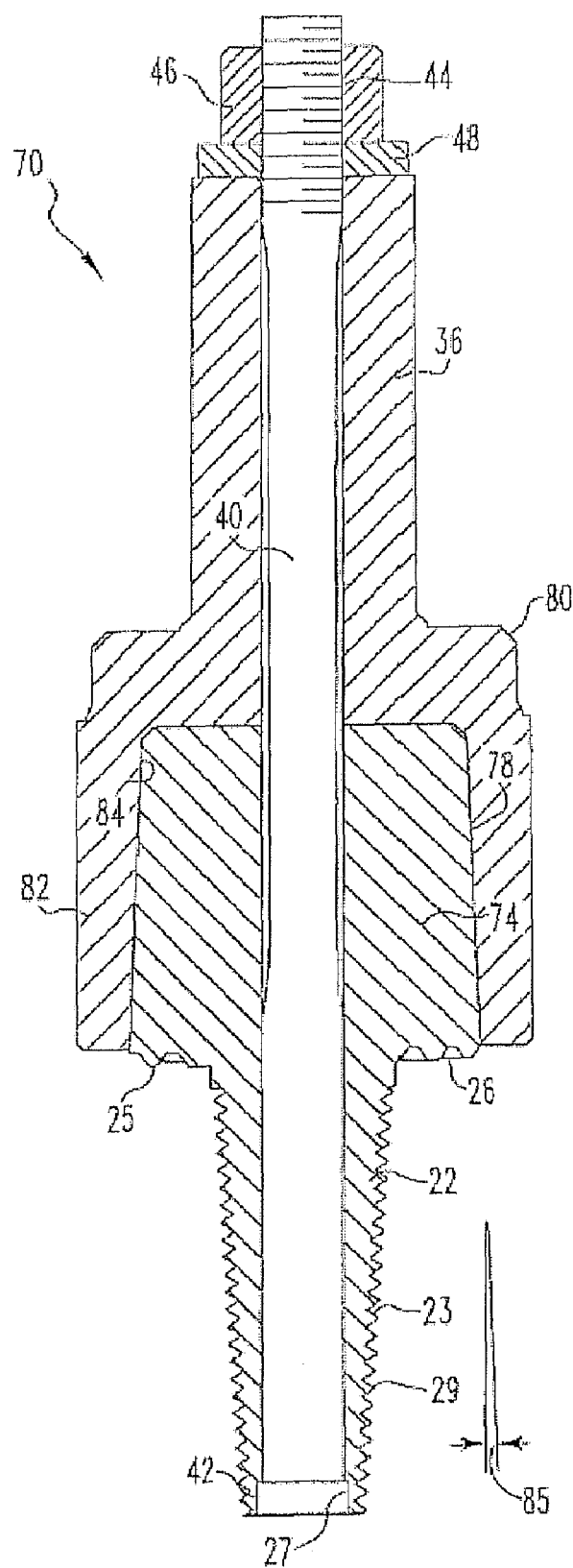
FIG. 6 is a sketch of a FSW tool having a compression sleeve having a release angle to facilitate disassembly.

Attention is directed to FIG. 6, which is an illustration of a friction stir welding tool 70 according to one embodiment of the present invention. Friction stir welding tool 70 includes a pin 22 which is integral with a shoulder 74. Pin 22 has working surface 29, preferably with threads 23. Shoulder 74 has working surface 26, preferably with spiral threads 25. Friction stir welding tool 70 includes a tool body 80 with a compression sleeve 82 defining therewithin a cavity 84.

Compression sleeve 82 provides radially inward compression on outer surface 78 of shoulder 74. Tool body 80 further includes a shank 36 which is for engagement with a chuck or collet (not shown) of a friction stir welding machine (not shown), to be rotated thereby.

Friction stir welding tool 70 is similar in many features to the friction stir welding tool 20 shown in FIG. 2. It includes, for example, tension member 40 which serves to place pin 22 in axial compression. Friction stir welding tool 70 is distinct from friction stir welding tool 20, however, in that the cavity 84 defined within compression sleeve 82 and the outer surface 78 of shoulder 74 in friction stir welding tool 70 are formed so as to have a release angle 85 to facilitate disassembly of friction stir welding tool 70. Preferably, release angle 85 is about one degree.

As with friction stir welding tool 20, the tool body 80 is heated and then assembled to shoulder 74 so as to place shoulder 74 in compression within cavity 84 of compression sleeve 82.

Preferably, the compression sleeve 82 has a higher coefficient of thermal expansion than the shoulder 74. Hence, to disassemble friction stir welding tool 70, the compression sleeve 82 is heated to expand it and loosen it from the shoulder 74.

Figure 7:
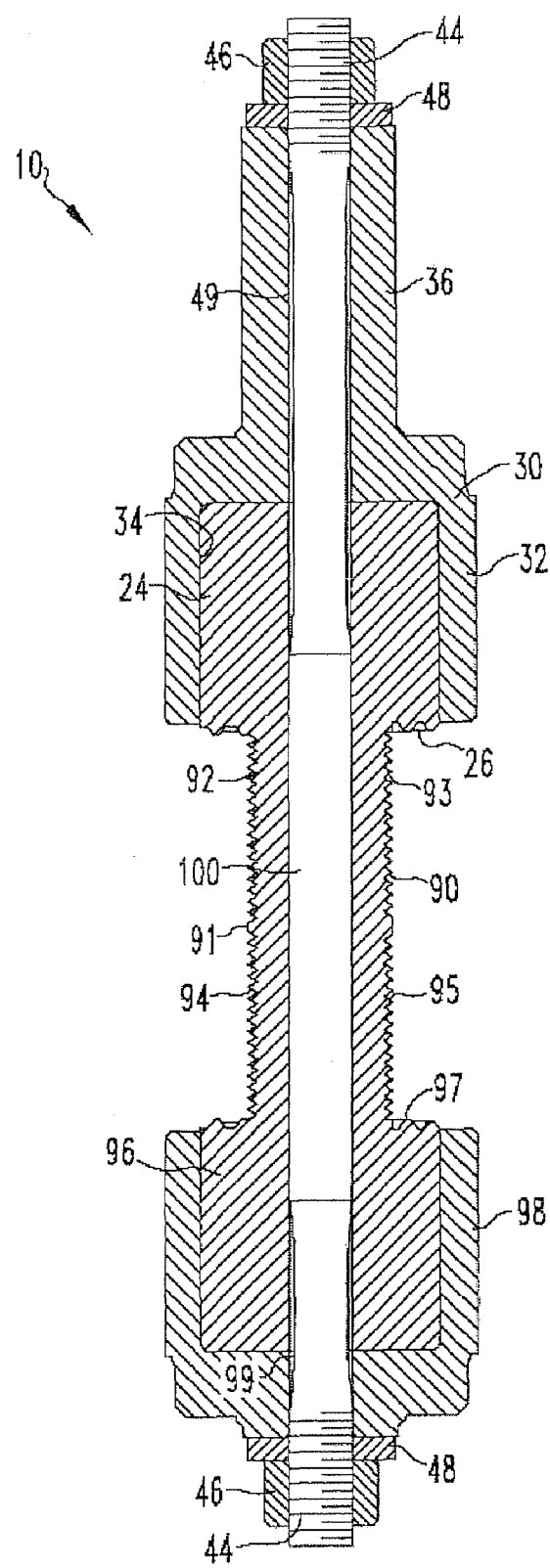
FIG. 7 is a sketch of a bobbin type FSW tool having two shoulders, both with compression sleeves.

Another embodiment of the present invention is illustrated in FIG. 7. Friction stir welding tool 110 is a bobbin type friction stir welding tool. It includes a friction stir welding pin 90 having a proximal pin portion 92 and a distal pin portion 94, integrally formed with proximal shoulder 24 and distal shoulder 96. Proximal shoulder 24 includes a working face 26, and distal shoulder 96 has working face 97. Friction stir welding tool 110 further includes a tool body 30 including a compression sleeve 32 and a shank 36. Shank 36 is for engagement with a chuck or collet of a friction stir welding machine (not shown) to be rotated thereby.

Preferably, working surface 93 of proximal pin portion 92 and working surface 95 of distal pin portion 94 have threads of opposite pitch, so that rotation of friction stir welding tool 110 in an appropriate direction tends to cause plasticized material to move along proximal pin portion 92 and distal pin portion 94, toward juncture 91 between proximal pin portion 92 and distal pin portion 94.

Compression sleeve 32 exerts a radially inward compressive stress on shoulder 24. Friction stir welding tool 110 further includes a distal compression sleeve 98 which exerts a radially inward stress on shoulder 96.

Friction stir welding tool 110 further includes a tension member 100, which exerts an axial compressive force on proximal shoulder 24 and on distal shoulder 96, and hence on pin 90. Tension member 100, preferably, is placed in tension by one of the nuts 46. One or more spring washers 48 may be provided to accommodate thermal expansion and/or creep of tension member 100.

A proximal gap 49 may be provided within shank 36 and proximal shoulder 24, and a distal gap 99 may be provided within distal shoulder 96 to facilitate assembly.

Friction stir welding tool 110 is for use in an environment wherein it is not possible to place an anvil on an opposite side of the workpiece(s) from the side of the shank 36 and the chuck or collet of the friction stir welding machine (not shown) which engages shank 36.

Whereas presently preferred and alternative embodiments of the present invention have been described in detail in the preceding discussion, it is noted that there are many other embodiments of the present invention within the scope of the appended claims.

We claim:

1. A friction stir welding tool comprising;
    (1) an integral pin and shoulder,
        (a) a pin portion designed that plunges into at least one workpiece to perform a friction stir welding operation on the at least one workpiece,
        (b) a shoulder portion including a working surface designed that engages at least one surface of the at least one workpiece,
        wherein (i) the pin portion includes a proximal end of the pin portion being contiguous with the working surface of the shoulder portion, (ii) a distal end opposite the proximal end, and (iii) a tension member engagement feature in proximity of the distal end;
    (2) a tool body defining a cavity therein, the cavity for receiving at least a portion of the shoulder portion of the integral pin and shoulder, the tool body further including a shank for engagement with a friction stir welding machine;
    (3) a tension member having (i) a distal end with an engagement feature complimentary to the tension member engagement feature of the pin portion and (ii) a proximal end with an engagement feature, wherein, the proximal end extends out of the tool body when the tension member is disposed within the integral pin-shoulder and the distal end engagement feature of the tension member is engaged with the tension member engagement feature of the pin portion; and
    (4) an adjustable tension member engagement device to adjustably engage the proximal end of the tension member to impose a predetermined inward axial force upon the tension member engagement feature of the pin portion and the tool body, thereby placing the pin portion in substantial compression between the distal end and the proximal end of the pin portion.

2. A friction stir welding tool, according to claim 1, wherein the shoulder includes a substantially cylindrical portion and the cavity in the tool body includes a substantially cylindrical portion, the substantially cylindrical portion of the shoulder being disposed within the substantially cylindrical portion of the cavity.

3. A friction stir welding tool, according to claim 1, wherein the shoulder is capable of being assembled into the cavity with positive interference, so that the tool body exerts a radially inward compressive stress on the substantially cylindrical portion of the shoulder.

4. A friction stir welding tool, according to claim 3, wherein the tool body is thermally reactive such that the compressive sleeve expands when it is heated before the shoulder is assembled into the cavity to facilitate an easy assembly with the proximal shoulder and to provide the radially inward compressive stress when the tool body contracts at room temperature.

5. A friction stir welding tool, according to claim 2, wherein the substantially cylindrical portion of the cavity and the substantially cylindrical portion of the shoulder have at least one nonzero release angle to facilitate disassembly of the shoulder from the tool body.

6. A friction stir welding tool, according to claim 5, wherein the release angle is about one degree.

7. A friction stir welding tool, according to claim 1, wherein the adjustable tension member engagement device is at least one nut acting through at least one spring washer.

8. A friction stir welding tool, according to claim 7, wherein the at least one nut and the at least one spring washer are disposed at a proximal end of the tension member.

9. A friction stir welding tool, according to claim 7, wherein the at least one nut and the at least one spring washer are disposed at a proximal end of the shank portion of the tool body.

10. A friction stir welding tool, according to claim 1, wherein the tension member includes a tension member shoulder at a distal end thereof and the pin portion includes a recess at a distal end thereof, the recess for receiving the tension member shoulder.

11. A fiction stir welding tool, according to claim 10, wherein the tension member further includes a passage therein, the passage being for a coolant fluid.

12. A friction stir welding tool, according to claim 1, wherein the tension member includes a pin extension, the pin extension being for extending the pin portion and for exerting a compressive force on the pin portion.

13. A friction stir welding tool, according to claim 12, wherein the pin extension includes threads on a working surface thereof.

14. A friction stir welding tool, according to claim 12, wherein the tension member further includes a passage therein, the passage being for a coolant fluid.

15. A bobbin type friction stir welding tool comprising:
a tool body defining a cavity therein, the tool body further including a shank for engagement with a friction stir welding machine;
an integral pin shoulder including: (i) a proximal shoulder disposed at least partially within the cavity; (ii) a friction stir welding pin having a proximal end contiguous with a working face of the proximal shoulder; (iii) a distal shoulder having a working face contiguous with a distal end of the friction stir welding pin;
a compression sleeve surrounding at least a portion of the distal shoulder, wherein the compression sleeve designed that exerts a radially inward compressive stress on the distal shoulder,
a tension member having an engagement feature at both ends thereof, wherein each of the ends of the tension member extends out of the tool body and the compressive sleeve when the tension member is disposed at least partially within the tool body, the integral pin shoulder, and the compressive sleeve,
an adjustable tension member engagement device to adjustably engage the tension member engagement feature to impose a predetermined inward axial force directly upon the compressive sleeve and the tool body, thereby the compressive sleeve and the tool body places the friction stir welding pin in substantial compression between the compressive sleeve and the tool body.

16. A bobbin type friction stir welding tool, according to claim 15, wherein the proximal shoulder includes a substantially cylindrical portion and the cavity in the tool body includes a substantially cylindrical portion, the substantially cylindrical portion of the proximal shoulder being disposed within the substantially cylindrical portion of the cavity.

17. A bobbin type fiction stir welding tool, according to claim 16, wherein the substantially cylindrical portion of the proximal shoulder is capable of being assembled into the substantially cylindrical portion of the cavity with positive interference, so that the tool body exerts a radially inward compressive stress on the substantially cylindrical portion of the proximal shoulder.

18. A bobbin type friction stir welding tool, according to claim 17, wherein the tool body is thermally reactive such that the compressive sleeve expands when it is heated before the proximal shoulder is assembled into the substantially cylindrical portion of the cavity to facilitate an easy assembly with the proximal shoulder and to provide the inward compressive stress when the tool body contracts at room temperature.

19. A bobbin type friction stir welding tool, according to claim 15, wherein the friction stir welding pin includes a proximal pin portion and a distal pin portion, a juncture between the proximal pin portion and the distal pin portion being about at a center of the friction stir welding pin, the proximal pin portion including a first thread and the distal pin portion including a second thread, the second thread opposite to the first thread, whereby rotation of the bobbin type friction stir welding tool in an appropriate direction tends to cause plasticized material to move toward the center of the friction stir welding pin.

20. The bobbin type fiction stir welding tool, according to claim 15, wherein the compression sleeve is thermally reactive such that the compression sleeve expands when it is heated before it is assembled to the distal shoulder to facilitate an easy assembly with the distal shoulder and to provide the radially inward compressive stress on the distal shoulder when the compressive sleeve contracts at room temperature.

21. The bobbin type friction stir welding tool, according to claim 15, wherein the adjustable tension member engagement device is at least one nut acting through at least one spring washer.

* * * * *